UNITED STATES PATENT OFFICE.

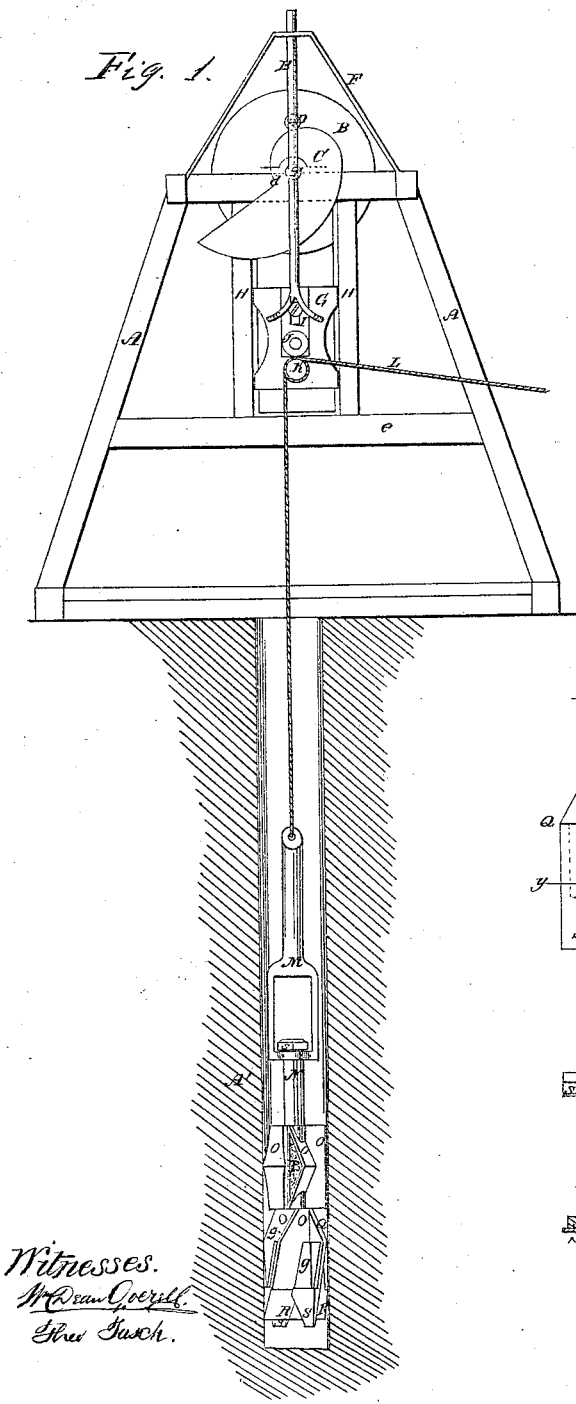

CALEB BATES, OF KINGSTON, MASSACHUSETTS.

IMPROVEMENT IN DRILLS FOR BORING WELLS.

Specification forming part of Letters Patent No. 48,892, dated July 25, 1865.

*To all whom it may concern:*

Be it known that I, CALEB BATES, of Kingston, in the county of Plymouth and State of Massachusetts, have invented a new and useful Improvement in Drills and Apparatus for Boring Wells; and I do hereby declare that the following is a full, clear, and exact description thereof, which will enable others skilled in the art to make and use the same, reference being had to the accompanying drawings, forming part of this specification, in which—

Figure 1 is an elevation of an apparatus including a drill and its appurtenances; Figs. 2, 3, and 4 are detailed views of the drill. Fig. 5 is a separate view of the feeding-screw. Figs. 6 and 7 are views of a modification of the apparatus for giving a drop-motion to the drill.

Similar letters of reference indicate like parts.

This invention has for its object the boring of the oil and other deep wells, and it embraces several improvements in apparatus for effecting the work.

The drill has several cutters, two of them with narrow faces set on opposite sides of the main cutter, and all the cutters are placed at an angle with the axis of the stock, so that they give a forward or angular stroke. The drill-stock is provided with vanes, also set angularly for the purpose of giving a partial rotation to the drill by means of the resistance of the fluid and débris of the rock through which the drill descends. The edges of these vanes are armed with surfaces of glass or other suitable material which will resist abrasion and protect the sides of the cutters, so that the drill shall not be worn to a smaller diameter. The head of the drill-stock works in a swivel, and is free to rotate and also to move vertically therein, so that the drill receives a downward blow from the swivel after the cutters have reached the bottom of the bore, and also an upward blow when the drill is being raised for the next stroke. The drill-rope is fed out automatically by means of a spiral groove formed on a stationary pin, around which the rope is wound, in connection with a friction-roller, which is placed above the said pin, and the stroke of the drill is effected by means of a drop-motion.

A represents a frame, which supports the apparatus, and A' a well which is being bored.

B is a driving-pulley, fixed on a shaft, B', running in bearings on top of the frame. This shaft also carries a cam, C, which serves to raise the drill after each fall.

H H are guides, fixed in the frame to guide the block G in its vertical movements. In the lower part of this block, and vertically beneath the shaft B', I fix a pin, K, with a spiral groove to receive the drill-rope L. The rope is kept in the grooves, and pressure is made on it by a pressure-roller, J, projecting from a sliding piece, I, which can move vertically in the block G and which is adjusted to bring the roll nearer to or farther from the pin K by means of a set-screw, which passes through a slot in the sliding piece.

E is a vertical lift-rod whose lower end is secured to the block G, and whose upper end is guided by a standard, F. A friction-roller, D, is placed on that side of the rod which is nearest the cam, and it is fixed at such a position on the rod as to rest on the periphery of the cam during the whole of its vibration, except when the point $d$, which is in the line of its shorter diameter, is vertically beneath the roll. When the cam is in this position the block G will rest upon the cross-piece $e$, but at other times the block, and consequently the drill, will be sustained by the roll upon the periphery of the cam C.

The rope L is attached to the shank of a swivel, M, to which the drill-stock N is connected. The yoke of the swivel is free to slide over the stock, whose head $f$ thereby alternately receives a blow from the top of the swivel when the drill is dropped, and a pull from its bottom when the rope is drawn up.

Q is the drill. It has three cutting-edges, one of which is continuous across the diameter of the drill, and the others are narrow, their faces being placed at right angles to the broad cutter, and their extreme edges being extended to the ends of the diametric line, which is coincident with the direction of their faces. Moreover, their faces are extended in advance of that of the broad cutter, as seen in Figs. 1 and 2, so that when the drill drops the narrow cutters strike the rock first. The broad cutter is composed, in this example, of two blades, R R, set edge to edge, so that their faces are in a continuous line. The shanks of the cutters are locked together and to the drill-stock N, in this example of my invention, by means of radial arms $g$, projecting from the stock. The arms are confined vertically between shoulders made on the shanks of the cutters, the upper shoulders being at right angles to their breadth, and the lower shoulders being made across their breadth or widest part. Consequently those arms which are held from above in the shanks of the cutters R are held below in the shanks of the cutters S, and vice versa. The cutters R and S are placed at an angle with the axis of the drill, and they all incline in the same direction and at the same angle, so as to bring the faces of the cutters R in line with each other and also the faces of the cutter S in line with each other. When, therefore, the drill drops, since its path of descent is in a vertical line, the cutters will strike the bottom of the well at an angle, and their strokes will therefore be more effective in reducing the rock. Besides, since the bottom of the well is generally full of water, or of the débris of the broken rock and of water mixed, the inertia of such débris will cause the drill to be rotated in the direction of the inclinations of the cutters, so as to strike the rock at a different place at each fall.

Above the cutters are vanes O, (in this example three in number,) fixed to the drill-stock. They are of triangular form in longitudinal section, their bases being parallel with the axis of the stock, and their angular sides being equal. These vanes are made hollow, and their cavities are filled with fine glass or quartz cemented into a mass, B, or with molten glass or some similar substance which, by resisting the abrasion of the rock, will protect the lateral edges or sides of the drill. The action of the angular sides of the vanes is to give a partial rotation to the drill, both on the descent of the vanes and on their ascent.

The operation of the narrow cutters S is to spalt the rock in the way common to stone-dressers preparatory to the use of a wide chisel. They are set in advance of the cutters R R, so as to prepare the way for the latter, and, being narrow, they will the more readily make an impression in the rock. They are placed at the outer ends of the diameter of the drill, so as to keep the bore of the well of full size. It is a common cause of complaint, in using drills, that the abrasion of their sides against the rock wears away and lessens the diameter of the cutters, and the bore therefore is gradually contracted and assumes a conical or tapering form. Whenever this occurs the drill is withdrawn and the bore is reamed out to the proper diameter, and the work is resumed with new drills of full diameter. This shortening of the diameter of the drill is prevented wholly or partially by my invention—that is, forming a vitreous surface or a compound surface having sufficient hardness upon the exposed sides of the vanes, so as to protect the drill and the vanes from abrasion. The said surface may be formed on the shanks of the drill themselves with like effect.

When the drill has fallen and has reached the rock the swivel descends over the drill-stock, and its upper part, which is made strong for this purpose, strikes the head $f$ of the stock and drives the cutters into the rock. When the rope is drawn up the swivel begins to rise before the drill, and, having acquired considerable velocity, its bottom strikes upward against the head $f$ and jerks the drill out of the rock in which it may be embedded. The fall or drop of the drill effects the feed of the rope by jerking it through the grooves of the pin K, the pressure of the roll J being kept so adjusted as to prevent the rope from slipping or being drawn through the grooves, by reason of the weight of the drill and swivel when they are being drawn upward.

I have shown in Fig. 1 how a drop-motion may be effected by the use of a cam and vertical rod. The same result can be obtained by the use of the device shown in Figs. 6 and 7, which consists in fixing a disk, T, near the end of the shaft B', in the place of the cam and cutting away one-half of the periphery of the disk, as seen at U, and forming shoulders V' V' at the ends of the depressions.

W is a friction-plate placed loosely on the end of the shaft, and held up to the disk by a nut, $a$, more or less tightly, according to the nature of the rock being bored. A pitman, $c$, is attached to the friction-plate by means of a crank-pin, $b$, and this pitman is attached to the block G. The crank-pin $b$ extends through the plate and forms a stop, V, which moves through the depression U of the disk, its motion being arrested by the shoulders V' V'. The operation of this drop-motion is as follows: The pitman $c$ being attached to the block G, the rotation of the shaft B brings one of the shoulders V' against the pin V, and the friction-plate will be carried around until it passes a vertical line, when the weight of the drill and the block and their appurtenances will cause the plate to turn independently on the shaft with more or less speed, according to the degree of friction made between its surface and that of the disk, and the pitman will fall a distance equal to the diameter of the disk T.

Among the advantages of my invention are rapidity of the action of the drill, from the extent of its cutting-surfaces, its angular stroke, and its leading spalting-cutters. The bore of the well will be made true and round by reason of the number of bearing-surfaces of the drill and vanes, and by the use of hard substances therein to protect the drill from the abrading action of the rock. The shape and construction here shown will be of avail to guide the drill and prevent it catching in fissures in the rock. Since the rotary motion of the drill is automatically produced the labor of an attendant for that purpose will be saved.

Since the different strata of rocks through which a deep well is bored vary in hardness and resistance to the action of the drill, it is evident that the automatic feed-motion will be of great utility, the amount of feed being always dependent on the advance of the drill itself.

The common mode of operating the drill is to let it down by means of a walking-beam actuated by a crank. It is evident that the drill will not advance so rapidly into the rock by this common mode as by the use of a drop-motion, as herein explained.

Having thus described my invention, I claim as new and desire to secure by Letters Patent—

1. In drills for boring oil and other wells, protecting their sides from abrasion by means of a vitreous or equivalent surface placed in the ends of the arms or vanes on the drill-stock, or elsewhere on the stock, substantially as above described.

2. The use of leading-cutters S for spalting the rock, in combination with the wide-cutting surface R R, substantially as described.

3. Setting the cutters of the drill at an angle with the axis of the drill-stock, substantially as and for the purpose described.

4. In combination with a drill adapted to operate as described, the swivel M, constructed and applied in the manner and for the purposes specified.

5. Feeding the rope of the drill automatically by means substantially as above described.

CALEB BATES.

Witnesses:
AZEL H. SAMPSON,
JOSEPH STETSON.